United States Patent [19]

Webster et al.

[11] 3,710,863
[45] Jan. 16, 1973

[54] TREATMENT OF FORMATIONS CONTAINING FRESH-WATER SWELLING CLAYS

[75] Inventors: William A. Webster, Arlington; Joseph U. Messenger, Dallas, both of Tex.

[73] Assignee: Mobil Oil Corporation

[22] Filed: Dec. 28, 1970

[21] Appl. No.: 102,146

[52] U.S. Cl.............166/272, 166/274, 166/305 R, 166/303
[51] Int. Cl.....E21b 43/22, E21b 43/24, E21b 43/25
[58] Field of Search..........166/303, 305 R, 272–275; 252/8.55 R, 8.55 B

[56] References Cited

UNITED STATES PATENTS

| | | | |
|---|---|---|---|
| 3,131,759 | 5/1964 | Slusser et al. | 166/305 R |
| 3,208,528 | 9/1965 | Elliott et al. | 166/305 R |
| 3,402,770 | 9/1968 | Messenger | 166/305 R |
| 3,482,632 | 12/1969 | Holm | 166/275 X |
| 3,064,732 | 11/1962 | Bernard et al. | 166/305 R |
| 3,236,306 | 2/1966 | Atwood | 166/273 X |
| 3,537,523 | 11/1970 | Gogarty et al. | 166/305 R |

*Primary Examiner*—Stephen J. Novosad
*Attorney*—William J. Scherback, Frederick E. Dumoulin, William D. Jackson, Henry L. Ehrlich, Andrew L. Gaboriault and Sidney A. Johnson

[57] ABSTRACT

This specification discloses a method of treating subterranean formations that contain fresh-water swelling clay materials and oil and water. A solution of metal halide salt, wherein the metal has an atomic weight of more than 24, dissolved in a miscible solvent is injected into the formation via a well communicating with the surface and penetrating the formation. This solution may be injected into the formation either prior to, concurrent with, or subsequent to the injection of an aqueous fluid into the formation.

8 Claims, No Drawings

TREATMENT OF FORMATIONS CONTAINING FRESH-WATER SWELLING CLAYS

BACKGROUND OF THE INVENTION

This invention relates to the treatment of subterranean formations containing clay materials and oil and water. In particular, this invention relates to the treatment of subterranean formations to mitigate damages caused by swelling of clay materials in the formation.

Fresh water can severely damage a formation when it contacts water-sensitive clays present therein as may occur, for example, during drilling operations or secondary recovery operations such as water drives and steam stimulation techniques. The clays, when contacted with fresh water "swell", thereby reducing the permeability of the formation. "At least two clay damage mechanisms are generally recognized. One is structural expansion in which water adsorbs between clay layers and enlarges particles. This occurs only with 'swelling type' clays. They consume pore space and decrease the permeability of rock. The other mechanism is clay dispersion and migration in which individual clay particles disperse (deflocculate) and flow downstream until they lodge in pore throats. This restricts flow through the pores even though the pore volume may be unchanged. " (Water and Steam Injectivity Retention with Calcium Chloride Pretreatments, by M. G. Reed, paper presented at the Spring Meeting of the Pacific Coast District Division of Production, American Petroleum Institute, Bakersfield, California, May 14-16, 1968 ).

The clay layers or platelets have an overall negative charge. This charge attracts cations which are present in formation waters. For example, sodium ($Na^+$), potassium ($K^+$), and calcium ($Ca^{++}$) ions are attracted to the clay platelets. It has been found that clays containing a predominant amount of sodium cations are more water sensitive than other clays. Damage caused by clay swelling has been attacked by an ion-exchange treatment as described in the OIL AND GAS JOURNAL, pp. 80-81, Nov. 30, 1964. In accordance with this treatment, cations which cause clays to be water sensitive are exchanged for those which reduce clay sensitivity to water. Solutions of various salts such as potassium chloride or calcium chloride are injected into the formation to inhibit clay swelling. The problem of clay swelling may be overcome by keeping the salt balance at the level it was before treatment. For example, if the formation water contains calcium, enough calcium is added to the treating fluid so that the calcium-ion concentration of the formation water is not reduced.

Another technique directed to solving the problems caused by clay swelling is described in U.S. Pat. No. 3,454,095 to Joseph U. Messenger and William W. Webster. In accordance with this technique, a single-phase solution is injected into the formation. This solution consists essentially of an organic liquid having mutual solubility for oil and water, and a cationic surfactant of the quaternary amine type, a water-soluble nonionic surfactant, or preferably a mixture of both surfactants. The solution should contain no substantial quantities of substances other than the organic liquid and surfactants herein mentioned, which substances cause interference to the proper functioning of these essential constituents.

SUMMARY OF THE INVENTION

This invention relates to a method of treating a subterranean formation containing fresh-water swelling clay materials. A solution of a miscible solvent having dissolved therein a metal halide salt wherein the metal has an atomic weight of greater than 24 is injected into the formation. This lessens the formation damage caused by swelling clays.

In accordance with another embodiment of this invention there is described a method of recovering oil from subterranean formations containing fresh-water swelling clay materials and oil and water. This method comprises injecting into the formation a solution of a miscible solvent having dissolved therein a metal halide salt wherein the metal has an atomic weight of greater than 24, injecting an aqueous fluid into the formation, and recovering oil from the formation. The aqueous fluid injected into the formation may be steam.

In accordance with still another embodiment of this invention, a solution of calcium chloride dissolved in butyl Cellosolve having a concentration within the range of from 5 grams of calcium chloride per liter of butyl Cellosolve to the solubility limit of calcium chloride in butyl Cellosolve is injected into the formation.

DESCRIPTION OF THE PREFERRED EMBODIMENTS

We have discovered a method of treating subterranean formations containing fresh-water swelling clay materials and oil and water whereby swelling of these clays when contacted with fresh water is greatly reduced. Use of this invention enables the realization of a greatly increased injectivity of aqueous fluids into the formation. This technique is particularly applicable for use in conjunction with secondary recovery techniques such as steam injection techniques and waterfloods.

In accordance with this invention there is provided a well which extends from the surface of the earth and penetrates the subterranean formation which contains fresh-water swelling clay materials and oil and water. The formation is treated by injecting thereinto a solution of a miscible solvent having dissolved therein a metal halide salt or mixture of such salts wherein the metal has an atomic weight of more than 24. By miscible solvent is meant a solvent which has mutual solubility for oil and water. Thereafter, aqueous fluids may be injected into the formation for carrying out desired secondary recovery operations as for example steam recovery techniques. Such techniques may involve single well recovery techniques or multiple well pattern recovery techniques. This treatment allows the steam to be injected into the formation at a much greater rate, thereby greatly reducing heat losses from the steam adjacent the steam transmission path leading from the surface down the well and into the formation. Thus, a greater amount of heat contained by the steam is injected into the formation which greatly improves the efficiency of the recovery technique.

This invention is also applicable with other aqueous recovery techniques such as waterfloods. Formations having water-sensitive clays may so swell as to greatly decrease, and in some cases even make impossible, the injection of water into the formation. By treating such formations with the miscible solvent-salt solution of this invention, these formations may respond so that they thereafter readily accept water injection thereinto.

The general theory by which this invention operates is thought to be that the miscible solvent removes the oil and water from the formation in the vicinity of the well and this removal of the water from the formation lessens the swelling of the water-sensitive clays in the formation. Further, the salt dissolved in the miscible solvent enters into an ion-exchange mechanism whereby the clays in the formation are altered to reduce the swelling thereof. After this ion exchange has taken place, fresh water may be injected into the formation without the ensuing swelling of the clays in the formation. In testing this invention we have found that greatly improved injectivity of steam is realized by treating the formation with the miscible solvent containing salt dissolved therein as distinguished from treating the formation by a slug of miscible solvent followed by a slug of an aqueous salt solution. In accordance with the general theory by which it is thought that this invention works, there is no explanation for this marked difference in injectivity. However, laboratory tests have clearly indicated superior injectivity results when treating a formation in accordance with the method of this invention.

Damage to the formation due to swelling of clays in the immediate vicinity of the well as distinguished from damage at greater distances from the well is the most harmful to the injectivity and productivity ability of a well penetrating a subterranean formation. Therefore, in order to lessen these damages the formation is treated by injecting thereinto a sufficient amount of the miscible solvent-salt solution to displace the oil and water in the formation from the vicinity of the well. Preferably, a sufficient amount of the miscible solvent-salt solution is injected to displace the oil and water in the formation from about the first 5 feet of the formation surrounding the well. A greater amount of solution may be injected but the resulting improvement per unit volume of solution injected diminishes after the first 5 feet of the formation surrounding the formation is treated. Examples of miscible solvents which may be used in carrying out this invention are normal hexanol, methyl Cellosolve (ethylene glycol monomethyl ether), ethyl Cellosolve (ethylene glycol monoethyl ether), butyl Cellosolve (ethylene glycol monobutyl ether), methyl alcohol, ethyl alcohol, and isopropyl alcohol. Examples of the salts which may be dissolved in the miscible solvents are calcium chloride, potassium chloride, magnesium chloride, aluminum chloride, and ferric chloride.

It is preferred that the salt dissolved in the miscible solvent be a divalent or trivalent metal halide salt. Such salts readily enter into an ion exchange with the sodium ion contained by the water-sensitive clay, replacing two or three sodium ions for each ion of divalent or trivalent metal halide salt respectively which enters into an ion exchange. A particularly preferred salt is calcium chloride. For best results it is also preferred that the miscible solvent-salt solution be dry, that is be essentially free of water. The reason for this is shown by the laboratory data, discussed later, where a marked injectivity improvement results when injecting steam into a tube containing sand and clay following a dry solution of calcium chloride dissolved in butyl Cellosolve as compared to following a slug of butyl Cellosolve followed by a slug of calcium chloride dissolved in water. Some water can be tolerated in the solution. However, the injectivity decreases as the amount of water in the solution increases.

A preferred solution for use in carrying out this invention is butyl Cellosolve containing dissolved therein calcium chloride in an amount within the range of from 5 grams per liter of butyl Cellosolve to the solubility limit of calcium chloride and butyl Cellosolve. Tests have been run which show the marked improvement in the injectivity of steam following the injection of a solution of butyl Cellosolve containing dissolved therein calcium chloride in an amount of 20 grams of calcium chloride per liter of butyl Cellosolve. It is preferred to inject the miscible solvent-salt solution into the formation ahead of the water or steam to be injected. However, beneficial results may also be obtained by injecting the nonaqueous solution concurrent with or subsequent to the injection of an aqueous fluid into the formation.

Laboratory tests have been carried out which clearly show the merits of this invention. In carrying out these tests, a stainless steel tube 4 feet long and 2 inches in diameter was used. The tube was filled with sand and a 5 percent clay mix was mixed with the sand. Five percent finely divided silica was added to keep the clay in place. Air was then evacuated from the pack and while under vacuum it was filled with a 3 percent brine solution. Thereafter, a residual oil saturation was established by flooding with a mineral oil (white oil) followed by more brine. Preceding the injection of steam into the pack there was injected a 2-inch slug (50 milliliters) of treatment solution into the pack. The progress of the steam front was monitored with a movable thermocouple sliding in a well through the center of the sand pack. The steam was allowed to traverse only one-third the length of the tube. Thereafter, injection was stopped and the tube was allowed to cool. The pack was then restored to its original liquid saturations by injecting oil and oil brine into the end of the pack opposite that of the steam entry.

A strip chart recorder was used for measuring temperature increase. With this recording it is possible to correlate directly inches of travel of the steam front per minute of time by noting the time lapse during the progression of the steam through the tube. The results of these experiments or test runs are tabulated in TABLE I below:

TABLE I

| Material | Steam Front Advance |
|---|---|
| 1. 50 ml slug CaCl$_2$ (20 gm/l) in H$_2$O | 0.07 in/min |
| 2. 50 ml slug butyl Cellosolve followed by 50 ml slug CaCl$_2$ (20 gm/l) in H$_2$O | 0.11 in/min |
| 3. 50 ml slug CaCl$_2$ (20 gm/l) in butyl Cellosolve | 0.70 in/min |

In Experiment 1, 50 milliliters of a solution of calcium chloride in water were injected into the tube followed by the injection of steam. In Experiment 2, a 50-milliliter slug of butyl Cellosolve was injected into the tube followed by a 50-milliliter slug of calcium chloride and water, which was then followed by steam. In Experiment 3, a 50-milliliter solution of calcium chloride dissolved in butyl Cellosolve (concentration of calcium chloride — 20 grams per liter of butyl Cellosolve) was injected into the tube ahead of the steam. The results tabulated in TABLE I show that the steam front traveled ten times as fast (0.70 in/min compared to 0.07 in/min) when preceded by the solution of calcium chloride dissolved in butyl Cellosolve as compared to the slug of calcium chloride dissolved in water and more than six times as fast (0.70 in/min compared to 0.11 in/min) as when separate slugs of butyl Cellosolve and calcium chloride in water were injected into the tube. This greatly improved speed of the steam front when preceded by calcium chloride dissolved in butyl Cellosolve shows the increased injectivity of steam into a formation made possible by this invention. Likewise, an increased injectivity of water when preceded by a slug of calcium chloride dissolved in butyl Cellosolve would be obtained.

What is claimed is:

1. A method of treating a subterranean formation containing fresh-water swelling clay materials and oil and water, said formation being penetrated by a well, comprising:
    injecting into said formation via said well an essentially water-free solution of a miscible solvent having dissolved therein a metal halide salt wherein the metal has an atomic weight of more than 24, whereby formation damage is reduced by mitigating the swelling of said clay particles.

2. The method of claim 1 wherein a sufficient amount of said solution is injected into said formation to displace said oil and water from the vicinity of said well.

3. The method of claim 2 wherein said miscible solvent is butyl Cellosolve and said salt is calcium chloride present in an amount within the range of from 5 grams per liter of butyl Cellosolve to the solubility limit of calcium chloride in butyl Cellosolve.

4. A method of recovering oil from a subterranean formation containing fresh-water swelling clay materials and oil and water, said formation being penetrated by a well, comprising:
    injecting via said well into said formation an essentially water-free solution of a miscible solvent having dissolved therein a metal halide salt wherein the metal has an atomic weight of more than 24, whereby the swelling of said clay particles is mitigated;
    injecting via said well an aqueous fluid into said formation; and
    recovering oil from said formation.

5. The method of claim 4 wherein said metal halide salt is selected from the class consisting of divalent and trivalent metal halide salts and mixtures thereof.

6. The method of claim 4 wherein a sufficient amount of said solution is injected into said formation to displace said oil and water from the vicinity of said well.

7. The method of claim 6 wherein said miscible solvent is butyl Cellosolve and said salt is calcium chloride which is present in an amount within the range of from 5 grams per liter of butyl Cellosolve to the solubility limit of calcium chloride in butyl Cellosolve.

8. A method of recovering oil from a subterranean formation containing fresh-water swelling clay materials and oil and water, said formation being penetrated by a well, comprising:
    injecting via said well into said formation an essentially water-free solution of butyl Cellosolve having dissolved therein calcium chloride in a concentration within the range of from 5 grams per liter of butyl Cellosolve to the solubility limit of calcium chloride in butyl Cellosolve, said solution being injected in an amount sufficient to displace said oil and water from the vicinity of said well;
    injecting via said well steam into said formation; and
    recovering oil from said formation.

* * * * *